US010835969B1

(12) United States Patent
Scaglione (10) Patent No.: US 10,835,969 B1
(45) Date of Patent: Nov. 17, 2020

(54) SELF-ALIGNING COUNTER BORE CUTTING TOOL AND METHOD OF OPERATION (71) Applicant: Andrew James Scaglione, Medford, OR (US)

(72) Inventor: Andrew James Scaglione, Medford, OR (US)

(*) Notice: Subject to any disclaimer, the term of this patent is extended or adjusted under 35 U.S.C. 154(b) by 0 days.

(21) Appl. No.: 16/403,916

(22) Filed: May 20, 2019

Related U.S. Application Data (60) Provisional application No. 62/691,742, filed on Jun. 29, 2018.

(51) Int. Cl.
B23B 51/08 (2006.01)
B23B 51/10 (2006.01)

(52) U.S. Cl.
CPC ............ B23B 51/08 (2013.01); B23B 51/108 (2013.01); Y10T 408/375 (2015.01)

(58) Field of Classification Search
CPC ..... B23B 51/08; B23B 51/108; B23B 51/104; B23B 51/04; B23B 51/0426; B23B 51/0433; B23B 2251/54; Y10T 408/375
USPC ...................................... 144/365, 48.2, 48.6
See application file for complete search history.

(56) References Cited

U.S. PATENT DOCUMENTS

| 1,554,669 | A | * | 9/1925 | Watkins | .................. | B23B 5/168 |
| | | | | | | 407/40 |
| 1,647,395 | A | * | 11/1927 | Costello | .................. | B23B 51/08 |
| | | | | | | 408/224 |
| 3,945,753 | A | | 3/1976 | Byers et al. | | |
| 4,134,706 | A | | 1/1979 | Stewart | | |
| 4,239,427 | A | | 12/1980 | Walton, II | | |
| 4,244,667 | A | | 1/1981 | Timmons | | |
| 4,735,529 | A | * | 4/1988 | Short | .................... | B23B 31/201 |
| | | | | | | 408/225 |
| 6,499,919 | B2 | | 12/2002 | Feld | | |
| 6,857,831 | B2 | * | 2/2005 | Davis | .................. | B23B 51/0433 |
| | | | | | | 408/204 |
| 6,893,194 | B2 | * | 5/2005 | Jones | .................. | B23B 51/0426 |
| | | | | | | 408/1 R |
| 6,986,627 | B2 | | 1/2006 | Feld | | |

(Continued)

FOREIGN PATENT DOCUMENTS

| DE | 2410120 A1 | * | 9/1975 | ........... B23B 1/0426 |
| DE | 9106185 U1 | * | 9/1991 | ........... B23B 1/0406 |

(Continued)

Primary Examiner — Ryan C Rufo
(74) Attorney, Agent, or Firm — Jerry Haynes Law (57) ABSTRACT A self-aligning counter bore cutting tool and method detachably attaches to a drill, and is rotatably driven by the drill, so as to cut a counter bore into a subfloor. The cutting tool includes an annular frame that has unique arm slots for retaining a plurality of cutting blades in a fixed position while rotating and cutting. A plurality of fastening blocks work to securely retain the blades in the arm slots. At least one oversized depth restriction frame extends beyond the blades to restrict the blades from cutting the counter bore beyond a predetermined depth. The frame includes a protruding shaft bushing that securely receives a drill chuck from the drill to create a secure, aligned coupling to the drill. The shaft bushing also aligns the blades with a mudsill fastening plate in the subfloor, so as to create a concentric counter bore at the appropriate depth in subfloor.

11 Claims, 8 Drawing Sheets (56) References Cited

U.S. PATENT DOCUMENTS

| | | | |
|---|---|---|---|
| 7,264,427 B1 | 9/2007 | Kunz-Mujica | |
| 7,661,911 B2 | 2/2010 | Zeiler et al. | |
| 8,070,397 B2 | 12/2011 | Durfee | |
| 8,070,398 B2 | 12/2011 | Durfee | |
| 8,100,612 B2 * | 1/2012 | Miyanaga | B23B 51/0426 |
| | | | 408/204 |
| 8,328,477 B2 | 12/2012 | Allen et al. | |
| 10,507,534 B2 * | 12/2019 | Ohana | B23B 51/104 |
| 2007/0258780 A1 * | 11/2007 | Chao | B23B 51/102 |
| | | | 408/206 |
| 2008/0181738 A1 * | 7/2008 | Capriotti | B23B 51/0473 |
| | | | 408/207 |
| 2013/0039708 A1 * | 2/2013 | Stenman | B28D 1/041 |
| | | | 408/16 |
| 2016/0279716 A1 * | 9/2016 | Gamboa Arias | B23B 51/0426 |
| 2017/0310095 A1 * | 10/2017 | Herth | H01R 13/518 |

FOREIGN PATENT DOCUMENTS

| | | | | |
|---|---|---|---|---|
| DE | 202017100778 U1 * | 5/2018 | | B23B 51/05 |
| GB | 212876 A * | 7/1924 | | B23B 1/107 |
| GB | 570099 A * | 6/1945 | | B23B 1/104 |
| GB | 2010708 A * | 7/1979 | | B23B 51/02 |
| GB | 2364662 A * | 2/2002 | | B23B 51/0426 |

* cited by examiner

SELF-ALIGNING COUNTER BORE CUTTING TOOL AND METHOD OF OPERATION

CROSS-REFERENCE TO RELATED APPLICATIONS

This application claims the benefit of U.S. provisional application No. 62/691,742, filed Jun. 29, 2018 and entitled COUNTER BORE CUTTING APPARATUS FOR CUTTING A FIXED-DEPTH COUNTER BORE IN A SUBFLOOR, which provisional application is incorporated by reference herein in its entirety.

FIELD OF THE INVENTION

The present invention relates generally to a self-aligning counter bore cutting tool and method of operation that is utilized to cut a fixed-depth counter bore in a subfloor. More so, the present invention relates to a counter bore cutting tool that detachably attaches to a drill, and is rotatably driven by the drill, so as to cut a counter bore into a subfloor; whereby the cutting tool includes an annular frame that has unique arm slots for retaining a plurality of cutting blades in a fixed position while rotating and cutting; a plurality of fastening blocks to securely retain the blades in the arm slots; at least one depth restriction bar positions adjacent to the blades to restrict the blades from cutting the counter bore beyond a predetermined depth; a protruding shaft bushing to securely receive a drill chuck from the drill to create a secure, aligned coupling to the drill, and to align the blades with a subfloor fastening plate in the subfloor.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, a subfloor provides a solid base for main flooring. Often, a plate washer is required by building code to be used to anchor a mudsill to the foundation. It is often desirable to cut a counter bore into the underside of the subfloor for relief of the plate washer. The subfloor rests over a foundation, so as to provide a more insulated, resilient ground surface.

Often, a counter bore is cut into the underside of the subfloor. The counter bore is a cylindrical flat-bottomed hole that enlarges another coaxial hole in the subfloor. A counter bore is typically used when a fastener, such as a socket head cap screw, is required to sit flush with or below the level of a workpiece's surface. Cutting a counter bore that is not too deep and is planar can be difficult however. The present invention provides a counter bore cutting tool that cuts a counter bore up to a predetermined depth in a subfloor, so as to remove material from the subfloor for nut, anchor bolt, and plate washer clearance.

Typically, an electrical power drill is used to rotatably actuate a drill bit or other tool. Often, the drill bit or tool is easily detached from the drill through a drill chuck. The drill chuck is usually a specialized type of clamp used to hold an object with radial symmetry, especially a cylinder. In drills it holds the rotating tool whereas in lathes it holds the rotating workpiece.

Other proposals have involved counter bore cutting devices. The problem with these cutting devices is that they do not cut a counter bore up to a predetermined depth. Also, the blades are not removable for maintenance and repositioning. Even though the above cited counter bore cutting devices meets some of the needs of the market, a self-aligning counter bore cutting tool that detachably attaches to a power drill, and is rotatably driven by the drill, so as to cut a counter bore into a subfloor; whereby the cutting tool includes an annular frame that has unique arm slots for retaining a plurality of cutting blades in a fixed position while rotating and cutting; a plurality of fastening blocks to securely retain the blades in the arm slots; at least one depth restriction bar positions adjacent to the blades to restrict the blades from cutting the counter bore beyond a predetermined depth; and a protruding shaft bushing to align the blades with a subfloor fastening plate in the subfloor, is still desired.

SUMMARY

Illustrative embodiments of the disclosure are generally directed to a self-aligning counter bore cutting tool and method of operation. The counter bore cutting tool is configured to detachably attach to a drill, and be rotatably driven by the drill for cutting a counter bore with a predetermined depth into a subfloor. An annular frame retains a plurality of blades at a fixed depth. The frame includes a protruding shaft bushing that serves to align the blades with a subfloor fastening plate so that a concentric counter bore is cut to the appropriate depth in the subfloor. The frame also includes a threaded female connection which accepts a hole saw quick connect adapter.

In this manner, the drill rotatably drives the annular frame that retains a plurality of blades in a coplanar relationship against the subfloor. The blades operate with correlating depth restriction bars that restrict the blades from cutting the counter bore beyond a predetermined depth into the subfloor. The formed counter bore provides sufficient space to create relief for a mudsill fastening plate, such as a plate washer. In one embodiment, the plate washer is used in the connection of the mudsill to the foundation. The counter bore is used to remove material from the underside of the subfloor to allow for plate washer, nut, and bolt relief. This allows the subfloor to sit flat on the mudsill.

The counter bore cutting tool provides an annular frame that is defined by a perimeter region and a concentrically disposed shaft. The frame is also defined by multiple arms extending in a cross shaped arrangement between the perimeter region and the shaft. The shaft is configured to detachably couple to a drill through a hole-saw quick connect, which also detachably couples to a drill bit. In this manner, the drill rotatably drives the annular frame.

The shaft bushing extends co-axially from one side of the annular frame. The shaft bushing is integral with the shaft. The extended configuration of the shaft bushing enables self-alignment of the annular frame with the washer plate, and also with a drill, a drill chuck and/or a drill bit during rotation and cutting operations.

Each arm in the annular frame forms an arm slot. The arm slot is defined by a sloped wall and a flat wall. The walls meet at an inner junction point, and extend out to an open end. The slot may form a ridge for holding the blades, as discussed below.

The open end of the arm slots are sized and dimensioned to receive corresponding blades. The blades slidably ingress and egress the arm slots for detachable operability. While in the arm slots, the blades rest snugly and coplanar against the flat wall of the arm slot. The blades are defined by a mount edge that orients towards the inner junction point of the arm slot, and a cutting edge that orients outwardly towards the open end of the arm slot.

A plurality of fastening blocks detachably fitted in corresponding arm slots to snugly retain the blades in position for cutting. The fastening blocks are defined by a tapered shape that corresponds to the sloped and flat walls of the arm slots; thus, enabling the fastening blocks to slidably ingress and egress the arm slots.

The fastening blocks and the sloped walls of the arm slot are defined by corresponding fastening apertures that receive at least one fastener. The fastener detachably fastens the fastening blocks to the sloped walls of the arm slots, with the blades sandwiched in between. This fastening means works to securely mount the blades in the blades slots at a desired depth for controlled cutting into the subfloor.

The frame projects beyond the cutting blade allowing for depth restriction. The frame restricts the blades from cutting into the subfloor beyond a predetermined depth. In one non-limiting embodiment, the frame restricts the blades from cutting more than ⅜" deep into the subfloor.

In another aspect, the arms form a cross-shaped arrangement inside the perimeter region of the annular frame.

In another aspect, the blades are defined by a beveled shape.

In another aspect, the shaft bushing has a cylindrical shape.

In another aspect, the fastening blocks form at least one fastening aperture.

In another aspect, the sloped wall forms at least one wall aperture.

In another aspect, the tool comprises a fastener.

In another aspect, the fastener passes through the fastening aperture and the wall aperture.

In another aspect, the fastener is a screw.

In another aspect, the predetermined depth comprises ⅜ inches.

In another aspect, the tool comprises an anchor bolt passing through the shaft.

In another aspect, the anchor bolt passes through a foundation below the subfloor and concentrically retains the frame over a pilot hole.

In another aspect, the drill comprises a drill bit.

In another aspect, the drill bit is 1¼ inches.

In another aspect, the drill comprises a drill chuck.

One objective of the present invention is to form a planar, counter bore in the underside of the subfloor to provide relief for a plate washer.

Another objective is to provide multiple blades that are at a fixed depth and replaceable.

Another objective is to provide multiple blades

Yet another objective is to enable self-alignment of the annular frame with a drill chuck through use of an extended shaft bushing that has a hole in the center to allow the drill bit to pass through and couple to the quick connect.

Yet another objective is to attach the drill bit, through the hole in the extended shaft bushing and through the threaded quick connect adaptor to a hole saw quick-connect bit that can be obtained over the counter at a hardware store.

Yet another objective is to cut a counter bore in the underside of the subfloor and remove material to allow for nut and anchor bolt clearance in an efficient manner.

Yet another objective is to provide a built in stop that restricts the blades from cutting a counter bore deeper than ⅜".

Yet another objective is to provide a counter bore cutting tool for cutting a counter bore at a fixed-depth of about ⅜" in a subfloor.

Yet another objective is to provide a counter bore cutting tool that saves time and money.

Other systems, devices, method 1200s, features, and advantages will be or become apparent to one with skill in the art upon examination of the following drawings and detailed description. It is intended that all such additional systems, method 1200s, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A self-aligning counter bore cutting tool 100 and method 1200 of operation is referenced in FIGS. 1-12. The self-aligning counter bore cutting tool 100, hereafter "cutting tool 100" is configured to detachably attach to a drill 700, and to be rotatably driven by the drill 700, to cut a counter bore 900 having a predetermined depth 902 into a subfloor 702.

The cutting tool 100 provides an annular frame 102 defined by a perimeter region and a central shaft 300 that securely receives a drill chuck 152 from the drill 700 to create a secure, aligned coupling to the drill 700. A plurality of arms 108a-d extend between the perimeter region 104 of the frame 102 and the shaft 300. The arms 108a-d form multiple arm slots 302a-d for retaining a plurality of cutting blades 110a-d in a fixed position while rotating and cutting. A shaft bushing 106 that extends from the shaft 300 is useful for aligning the blades 110a-d with a mudsill fastening plate 704, such as a plate washer, so that a concentric counter bore 900 is cut to the appropriate depth in the subfloor 702. The annular frame 102 is wider than the cutting blades, and includes at least one restriction frame 116a-b to restrict the blades 110a-d from cutting the counter bore 900 into the subfloor 702 beyond a predetermined depth 902 of about ⅜".

Those skilled in the art will recognize that a subfloor 702 provides a solid base for main flooring. Often, a mudsill fastening plate 704, such as a plate washer, is required by building code to be used to anchor a mudsill or sill plate 1100 to a foundation 1002 beneath the subfloor 702. It is often desirable to cut a counter bore 900 into the underside of the subfloor 702 for relief of the plate washer. As described in the present invention, the counter bore is a cylindrical flat-bottomed hole that enlarges another coaxial hole in the underside of the subfloor 702.

Cutting a counter bore 900 that is not too deep and is planar can be difficult however. Thus, the present invention provides a counter bore cutting tool 100 for cutting a fixed-depth counter bore 900 in the subfloor 702, and removing material from the underside of subfloor 702 to allow a nut and an anchor bolt 1000 through the subfloor 702 and the foundation 1002 beneath.

Figure 1:
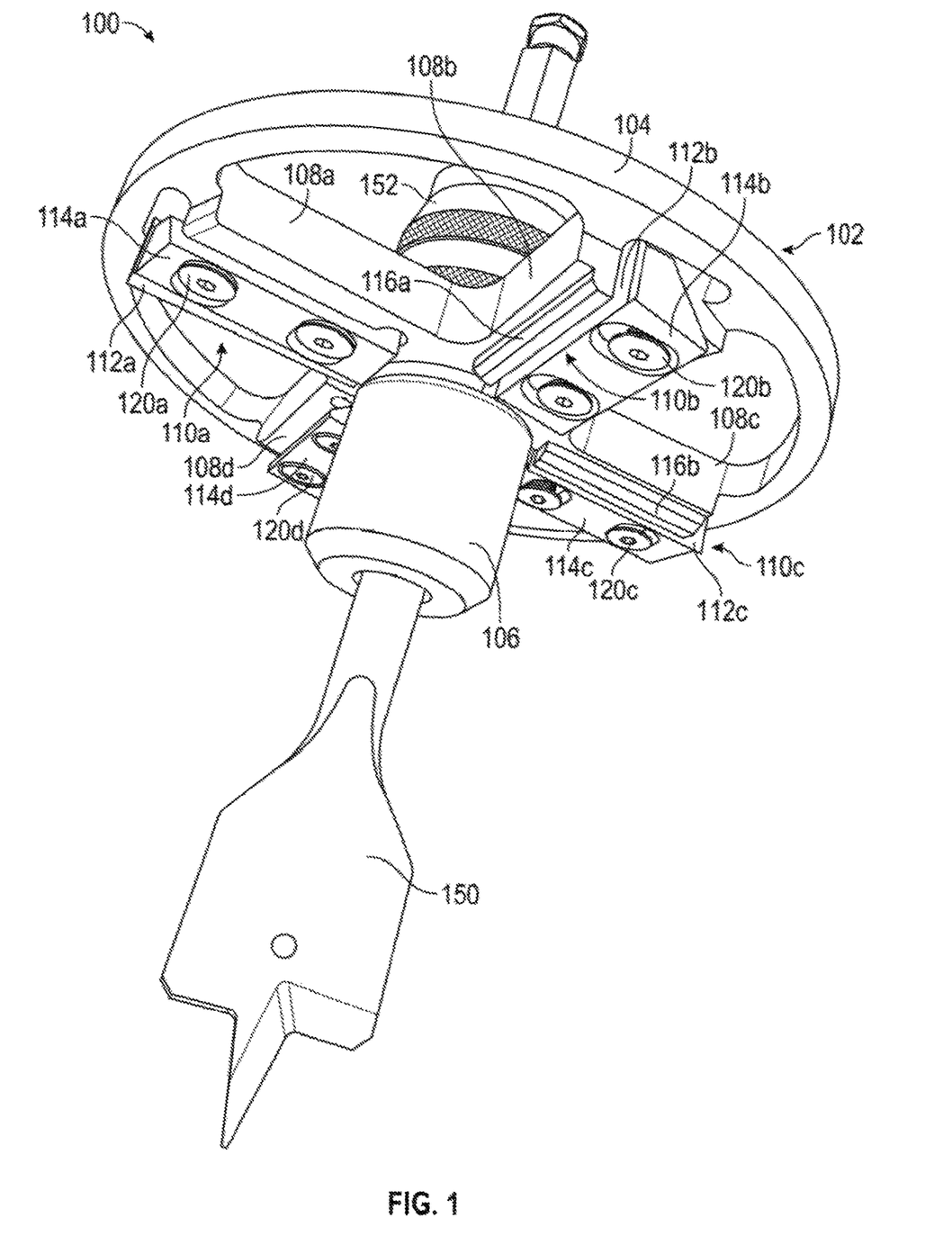
FIG. 1 illustrates a perspective view of an exemplary counter bore cutting tool coupled to a drill bit and a drill chuck, in accordance with an embodiment of the present invention.

As referenced in FIG. 1, the cutting tool 100 comprises an annular frame 102 that is defined by a perimeter region 104 and a concentrically disposed shaft 300. The annular frame 102 has a generally circular shape and is fabricated from a rigid material, such as a metal, a metal alloy, a rigid polymer, or combinations thereof. The frame 102 is operational for axial rotation, and specifically for being rotatably driven by a drill 700.

The cutting tool 100 further includes a shaft bushing 106 that extends co-axially from the shaft 300. The shaft bushing 106 may be integral with the shaft 300, or may be detachable therewith. In some embodiments, the shaft bushing 106 may be defined by a cylindrical shape. Though in other embodiments, other shapes and sizes may be used, as the present invention is scalable.

The shaft bushing 106 is operational to enable alignment through a 1¼" pilot hole made by the 1¼" drill bit 150. This alignment functionality is possible because the shaft bushing 106 protrudes from one side of the frame 102. The alignment functionality provided by the shaft bushing 106 allows for stable rotational driving of the frame 102 against the subfloor 702.

Furthermore, the shaft bushing 106 allows the drill bit 150 to align with, and cut a concentric counter bore 900 to the underside of the subfloor. The mudsill fastening plate 704 may include, without limitation, a plate washer fastened into the mudsill, a nut and anchor bolt 1000, and any fastening means known in the art to be used in subfloors. Additionally, the shaft bushing 106 allows for a quick-connect relationship with the drill bit 150. This can include a friction fit attachment, a pressure fit attachment, or other drill-type attachments known in the art. This detachment of the drill bit is shown between FIGS. 1 and 2.

As discussed above, the drill 700 couples to the frame 102 of the cutting tool 100 to rotatably drive the blades 110a-d in the frame 102 against the subfloor 702, and thereby cut the counter bore 900. The drill 700 may include an electric power drill 700, or other power tool known in the art for automated rotatable actuation. The threaded female hole on the backside of frame 102 is configured to detachably couple the frame 102 to hole-saw quick connect adapter, which also detachably couples to a hole saw quick connect 152 and drill bit 150.

In another possible embodiment, the drill 700 comprises a drill chuck 152 that couples to the shaft 300, and a drill bit 150 that passes through the shaft 300 to engage, and potentially pass through the subfloor 702. In one non-limiting embodiment, the drill bit 150 has a cutting diameter of about 1¼". The described drill 700, drill bit 150, and drill chuck 152 may be part of the invention. In other embodiments, the cutting tool 100 is operational with any over the counter drill 700 assembly known in the art.

Figure 2:
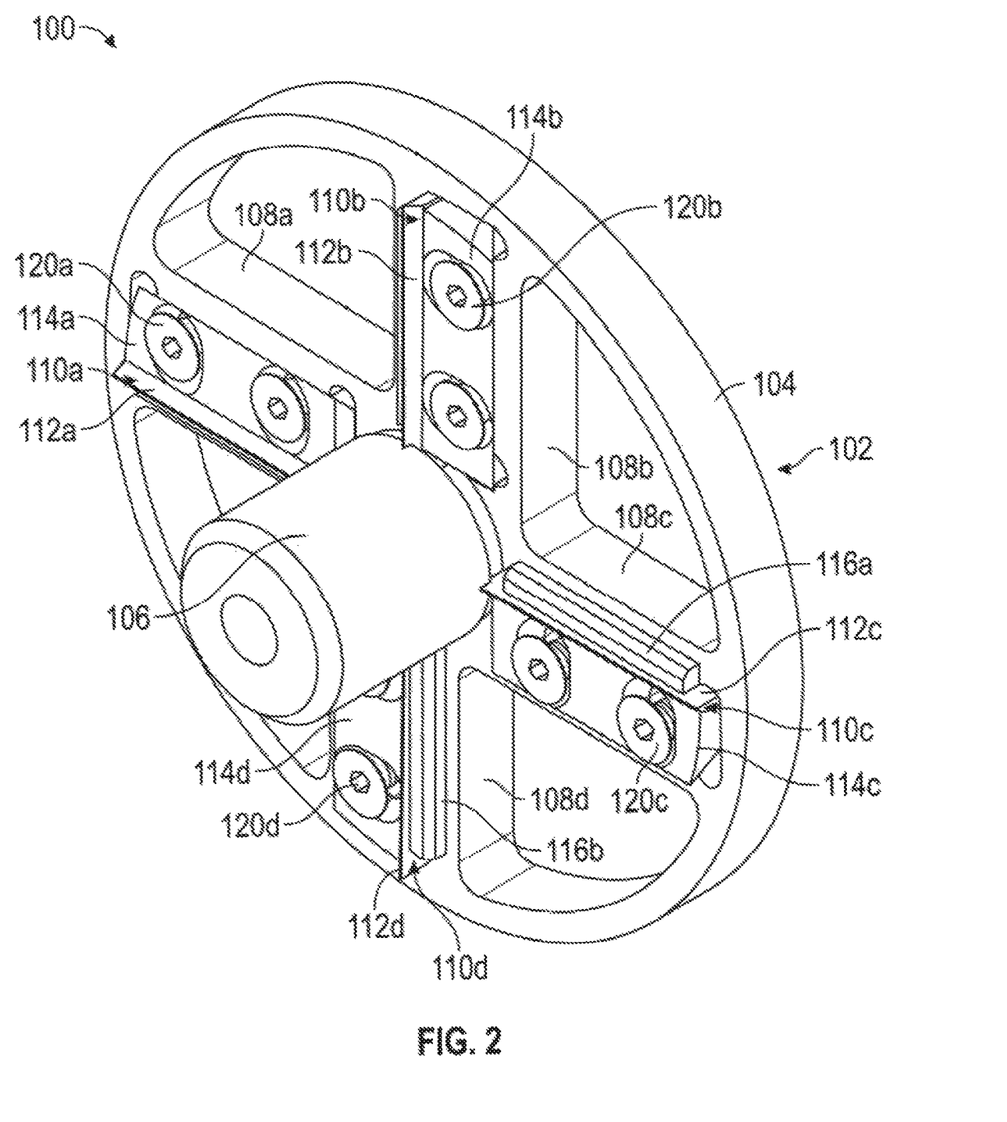
FIG. 2 illustrates a perspective view of the counter bore cutting tool, shown in FIG. 1, showing the blades fastened into the arm slots with the fastening block, in accordance with an embodiment of the present invention.

As FIG. 2 illustrates, a plurality of arms 108a-d extend between the perimeter region 104 of the frame 102 and the shaft bushing 106. In one non-limiting embodiment, the arms 108a-d form a cross shape inside the perimeter region 104 of the frame 102. Further, the arms 108a-d form multiple arm slots 302a-d that run longitudinally along one face of the arms 108a-d. The arm slots 302a-d are defined by a sloped wall 308 and a flat wall 312. The arm slots 302a-d also have an open end 316 that is sized and dimensioned to receive corresponding blades 110a-d.

Figure 4:
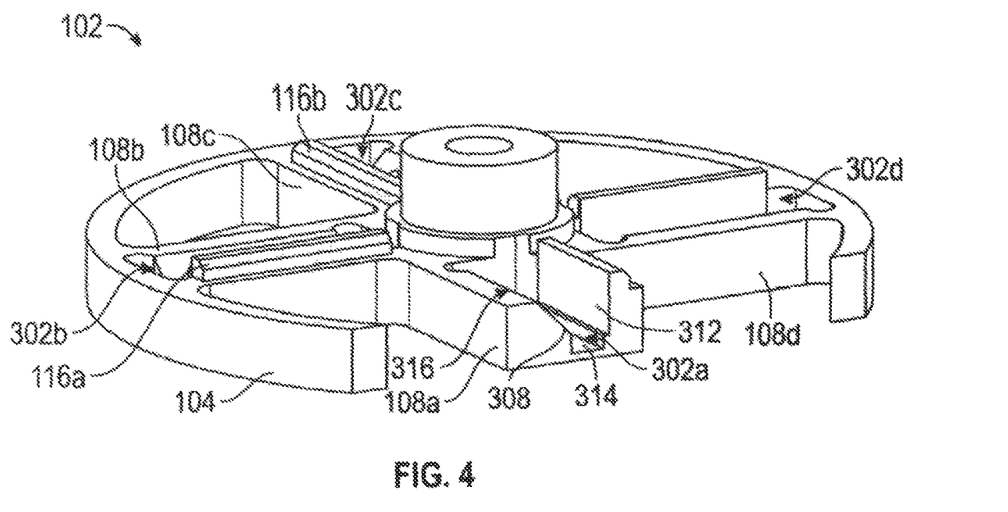
FIG. 4 illustrates a close up of the cross section view of the counter bore cutting tool, showing the arm and arm slot, in accordance with an embodiment of the present invention.

As illustrated in FIG. 4, the walls 308, 312 of the arm slots 302a-d meet at an inner junction point 314. Specifically, the flat wall 312 and the sloped wall 308 form a *nexus* at the inner junction point 314 from inside the arm slots 302a-d. The walls 308, 132 extend from the inner junction point 314 out to an open end 316 on the outer surface of the arm slots 302a-d. In one embodiment, the flat wall 312 is parallel with the cross-sectioned plane of the frame 102. The sloped wall 308 may include a slope of about 45° relative to the cross-sectioned plane of the frame 102.

Further, the sloped wall 308 forms at least one wall aperture 310 that is used to receive at least one fastener 120a-d for fastening the blades 110a-d into the arm slots 302a-d, as described below. In one alternative embodiment, the arm slots 302a-d form a ridge for holding the blades 110a-d, as discussed below. The blades 110a-d slidably ingress and egress the arm slots 302a-d for detachable operability, as discussed below.

For cutting the counter bore 900, the cutting tool 100 utilizes a plurality of blades 110a-d that are fitted into the arm slots 302a-d. The blades 110a-d are defined by a mount edge 304a-d and a sharp cutting edge 112a-d. In one embodiment, the blades 110a-d are also defined by a beveled shape. In one non-limiting embodiment, four blades 110a, 110b, 110c, 110d fit into four respective arm slots 302a, 302b, 302c, 302d.

Figure 5:
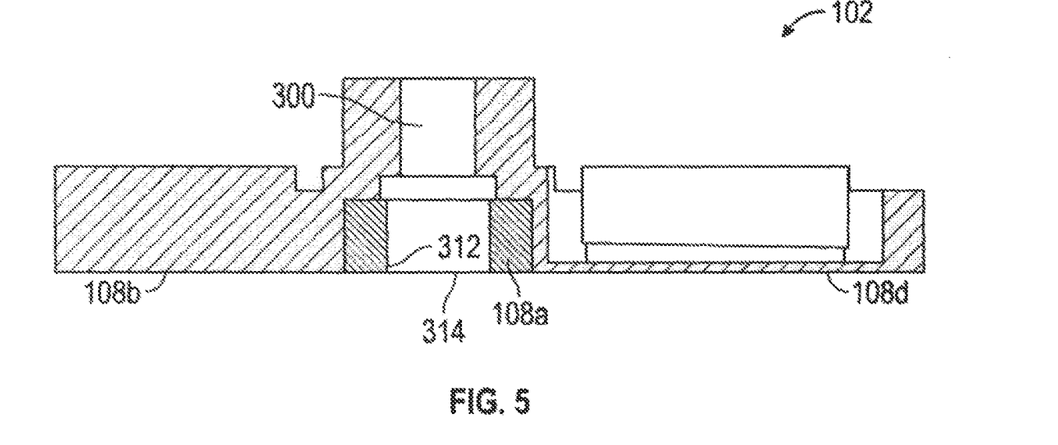
FIG. 5 illustrates a sectioned side view of the counter bore cutting tool, shown in FIG. 1, in accordance with an embodiment of the present invention.

As shown in FIG. 5. the blades 110a-d fit into the arm slots 302a-d, as the mount edge 304a, 304b, 304c, 304d for each blade 110a-d orients towards the inner junction point 314 of the arm slots 302a-d; and the cutting edge 112a, 112b, 112c, 112d for each blade 110a-d orients towards the open end 316 of the arm slots 302a-d.

The blades 110a-d are operational to slidably ingress and egress to and from the arm slot 302a-d. While in the arm slots 302a-d, the blades 110a-d are disposed coplanar against the flat wall 312 of the arm slots 302a-d. Primarily, the blades 110a-d are operational to rotatably engage the subfloor 702, so as to form a counter bore 900 therein.

The blades 110a-d are independent components that can be positioned adjacently to the fastening blocks 114a-d in the arm slots 302a-d, as discussed below. While in the arm slots 302a-d, the blades 110a-d are set in relation to the arm slots 302a-d. The blades 110a-d are unique in exhibiting a beveled, or sloped design which allows only half of the protruding edge of the blade to engage the subfloor 702 at a time. In this manner, the blade can rotatably engage the subfloor 702 and form a counter bore 900 having a predetermined depth 902. In one non-limiting embodiment, the blade is metallic, substantially flat, and forms a sharp cutting edge 112a-d, so as to cut through the subfloor 702, which can often be wood.

In this manner, the drill 700 rotatably drives the blades 110a-d in a coplanar relationship against the subfloor 702. The blades 110a-d operate with a correlating depth restriction frame 116a, 116b that restricts the blades 110a-d from cutting the counter bore 900 beyond a predetermined depth 902 into the subfloor 702. Consequently, the formed counter bore provides sufficient space to create relief for a mudsill fastening plate 704, such as a mudsill fastening plate 704 or plate washer. Those skilled in the art will recognize that the mudsill fastening plate 704 is commonly used to anchor a mudsill or sill plate 1100 to the foundation 1002, which is itself covered by the subfloor 702.

Figure 3:
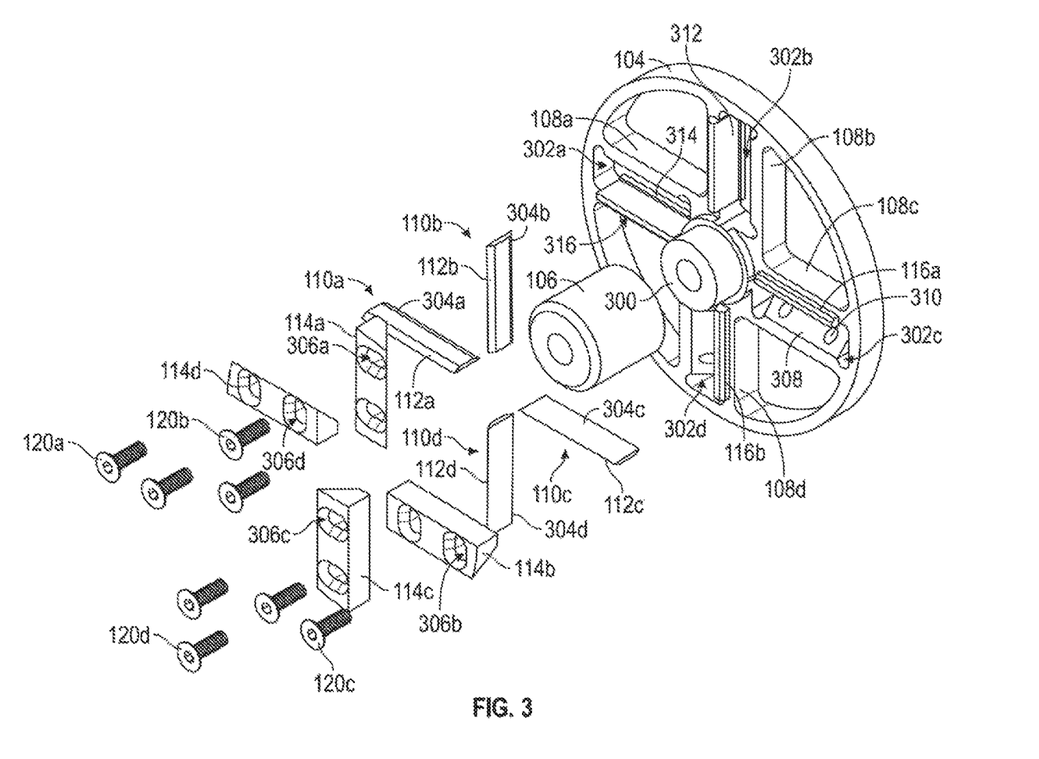
FIG. 3 illustrates a blow up view of the counter bore cutting tool, shown in FIG. 1, in accordance with an embodiment of the present invention.

Looking now at FIG. 3, the cutting tool 100 comprises a plurality of fastening blocks 114a-d used to retain the blades 110a-d in the arm slots 302a-d. Specifically, the fastening blocks 114a-d are operational to slidably ingress and egress the arm slots 302a-d. While in the arm slots 302a-d, the fastening blocks 114a-d retain the blades 110a-d at a fixed position in the arm slot. Thus, the blades 110a-d rest snugly and coplanar against the flat wall 312 of the arm slots 302a-d. The fastening blocks 114a-d are defined by a tapered shape that corresponding to the sloped and flat wall 312 of the arm slots 302a-d.

In some embodiments, the fastening blocks 114a-d form at least one fastening aperture 306a-d. A fastener 120a-d, such as a screw or bolt, passes through the fastening aperture 306a-d and the wall aperture 310 to secure the fastening blocks 114a-d and the blades 110a-d into the arm slots 302a-d.

The fastener 120a-d detachably fastens the fastening blocks 114a-d to the sloped walls of the arm slots 302a-d, with the blades 110a-d sandwiched in between. This fastening means works to securely mount the blades 110a-d into their respective arm slots 302a-d at a desired depth for controlled cutting into the subfloor 702. In one non-limiting embodiment, each fastening block 114a, 114b, 114c, 114d has two fastening apertures 306a, 306b, 306c, 306d that receive two fasteners 120a, 120b, 120c, 120d.

Conversely, the blades 110a-d can be removed from their respective arm slots to sharpen or reposition their depth in the arm slots 302a-d. This is accomplished by removing the fastener 120a-d and egressing the fastening blocks 114a-d from the arm slots 302a-d. The new or replacement blades 110a-d are then repositioned in the arm slots 302a-d along with the fastening block 114a-d. The fastener 120a-d passes through the fastening aperture 306a-d and wall aperture 310 and tightened, as the fastening blocks 114a-d forcibly press against the sloped wall 308 and blade 110a to securely affix the blade 110 into the arm slot 302a.

Looking again at FIG. 2, oversized frame 104 having at least one cutting depth restriction frames 116a-b. This may include two linear restriction frames 116a, 116b that cross the diameter of the annular frame 102 from different angles. The frame 104 extends beyond the cutting capacity of the cutting blades 112 allowing for a cutting depth of ⅜". The frame engages the subfloor once the desired cutting depth is reached, restricting the cutting blades 110 a-d from cutting deeper.

Figure 6:
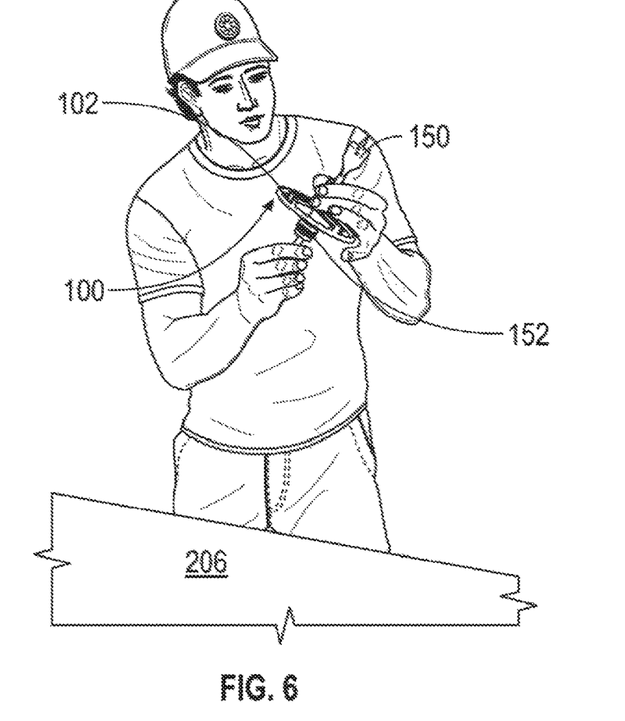
FIG. 6 illustrates a perspective view of a standard drill attached to the shaft of the frame through a drill bit, in accordance with an embodiment of the present invention.

As illustrated in FIGS. 6-9, the operation of the cutting tool 100 is simple and requires minimal skill set and tools. For example, FIG. 6 shows a standard drill 700, such as an electric power drill, attached to the hole saw quick connect adapter, attached to the frame 102 through a hole saw quick connect, attached to a drill chuck 152 and a drill bit 150. The cutting tool 100 is scalable, and thus designed such that any variety of power drills may be operational with the cutting tool 100. Further, the shaft bushing 106 is used to self-center the frame 102 during rotation. This is possible because the shaft bushing 106 protrudes from one side of the frame 102, serving as an alignment tool for the frame 102.

Figure 7:
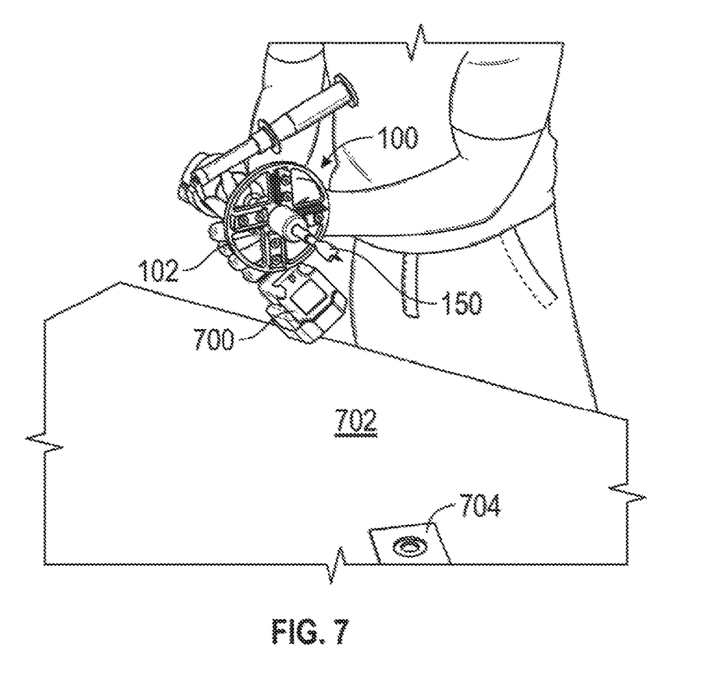
FIG. 7 illustrates a perspective view of the subfloor and the cutting tool attached to the drill, in accordance with an embodiment of the present invention.

It is known in the art that a subfloor 702 often requires material to be removed to accommodate a mudsill fastening plate 704, or performing other projects on the subfloor 702. Thus, the circular shape of the frame 102 is sized and dimensioned to form a counter bore 900 at the shape and dimensions of the cutting blades 110 a-d. As FIG. 7 shows, each blades 110a-d is locked in place in its respective arm slots 302a-d. The blades 110a-d are fitted into a respective arm slots 302a-d, so as to cut the counter bore 900 at the predetermined fixed depth 702 of about ⅜".

Figure 8:
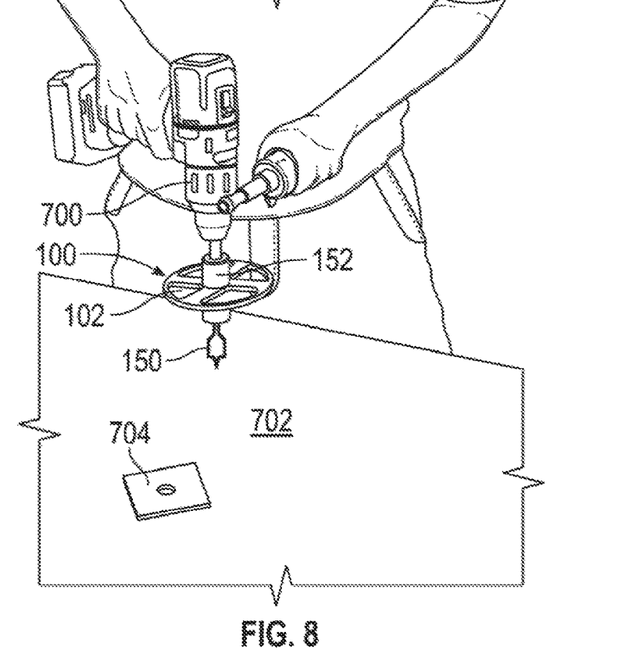
FIG. 8 illustrates a perspective view of the face of the frame from which the blades extend being oriented towards the underside of the subfloor for cutting operation, in accordance with an embodiment of the present invention.

Turning now to FIG. 8, the face of the frame 102 from which the blade cutting edge 112a-d extends is oriented towards the subfloor 702 for cutting the counter bore 900. The drill 700 drives the drill bit 150 into the subfloor 702 until the rotating blades 110a-d engage the subfloor 702. Consequently, a circular counter bore is cut out of the subfloor 702, and is ready to cover the plate washer.

Figure 9:
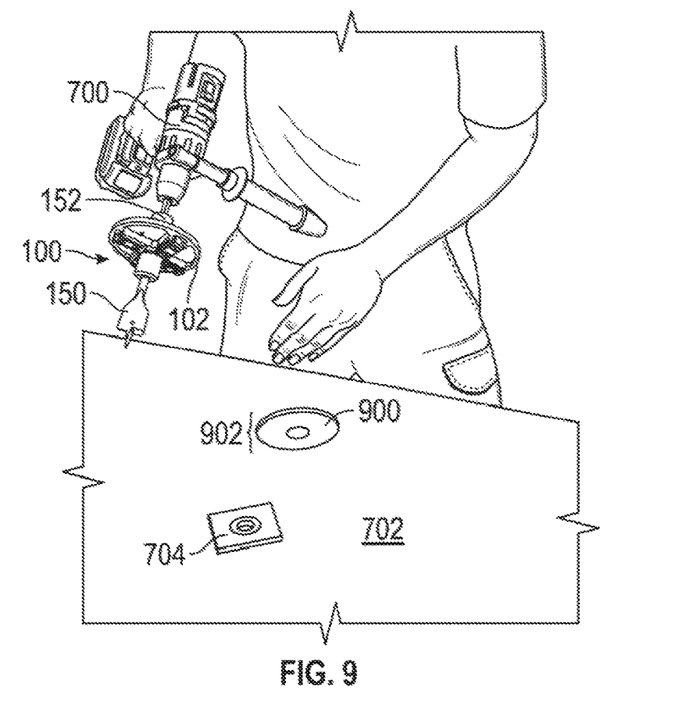
FIG. 9 illustrates a perspective view of a circular counter bore with a smaller hole for nut and anchor bolt clearance formed in the underside of the subfloor, ready to cover the plate washer, in accordance with an embodiment of the present invention.

Further, the annular frame 102 provides a built in stop that does not allow the counter bore to exceed ⅜" in depth. Specifically, FIG. 9 illustrates a perspective view of a circular counter bore with a smaller pilot hole 1102 drilled into the subfloor 702 to enable a nut and anchor bolt 1000 clearance in the underside of the subfloor 702. At this stage, the subfloor is ready to cover the mudsill fastening plate 704.

Figure 10:
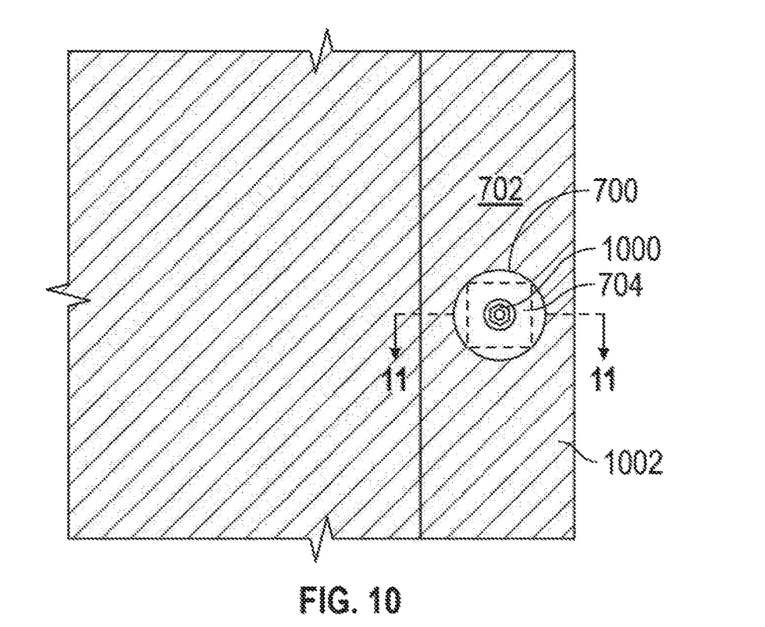
FIG. 10 illustrates a plan view of a circular counter bore with a smaller hole for nut and anchor bolt clearance formed in the underside of the subfloor, in accordance with an embodiment of the present invention.

Looking now more closely at the counter bore 900 formed by the cutting tool 100, FIG. 10 illustrates a plan view of a circular counter bore 900 formed in a subfloor 702. The frame 102 and blades 110a-d are also illustrated to provide perspective. A pilot hole 1102 has been formed concentrically through the counter bore 900 to enable passage of a nut and an anchor bolt 1000 through the underside of the subfloor 702.

As discussed above, the cutting tool 100 provides fixed depth blades 110a-d and a built-in depth restriction frame 116a, 116b that prevents the blades 110a-d from cutting the counter bore more than ⅜" deep into the subfloor 702. The counter bore 900 provides sufficient space to create relief for a plate washer, commonly used to anchor the mudsill or sill plate 1100 to the foundation, which is then covered by the subfloor 702. In one embodiment, the plate washer is used in the connection of the mudsill to the foundation. The counter bore 900 is used to remove material from the underside of the subfloor to allow for plate washer, nut, and bolt relief. This allows the subfloor to sit flat on the mudsill.

Figure 11:
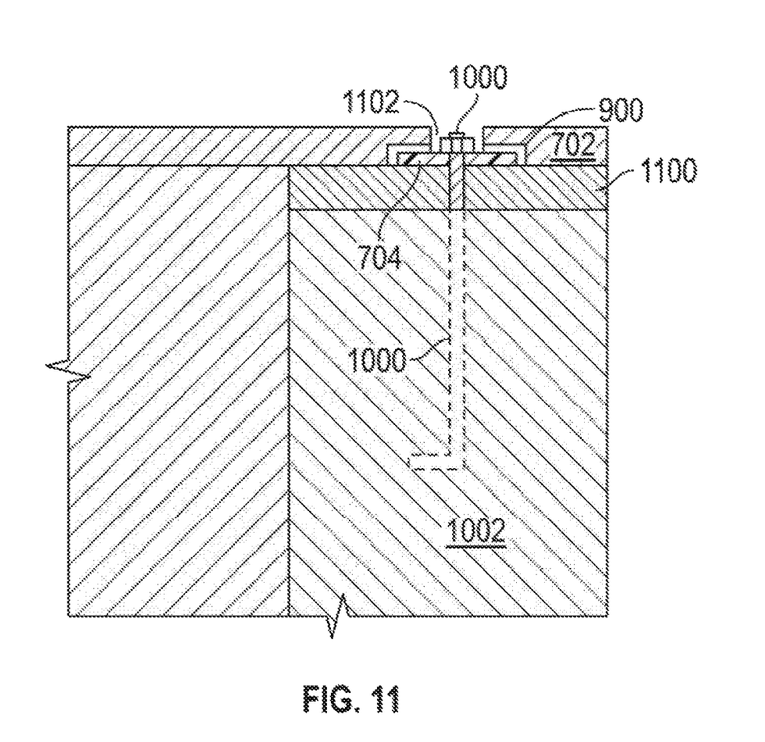
FIG. 11 illustrates a sectioned side view of the counter bore, the section taken along section A of FIG. 10, detailing the counter bore over a foundation bolt in the foundation, in accordance with an embodiment of the present invention.

Continuing with the illustrations, FIG. 11 references the counter bore 900, and specifically the section taken along section A of FIG. 10, detailing the counter bore that is cut over a foundation anchor bolt 1000 into the support foundation 1002. The counter bore 900 creates relief for a mudsill fastening plate 704, and the pilot hole from the pilot bit creates relief for the nut and anchor bolt. The blades 110a-d may be affixed coplanar to each other for cutting the counter bore.

Figure 12:
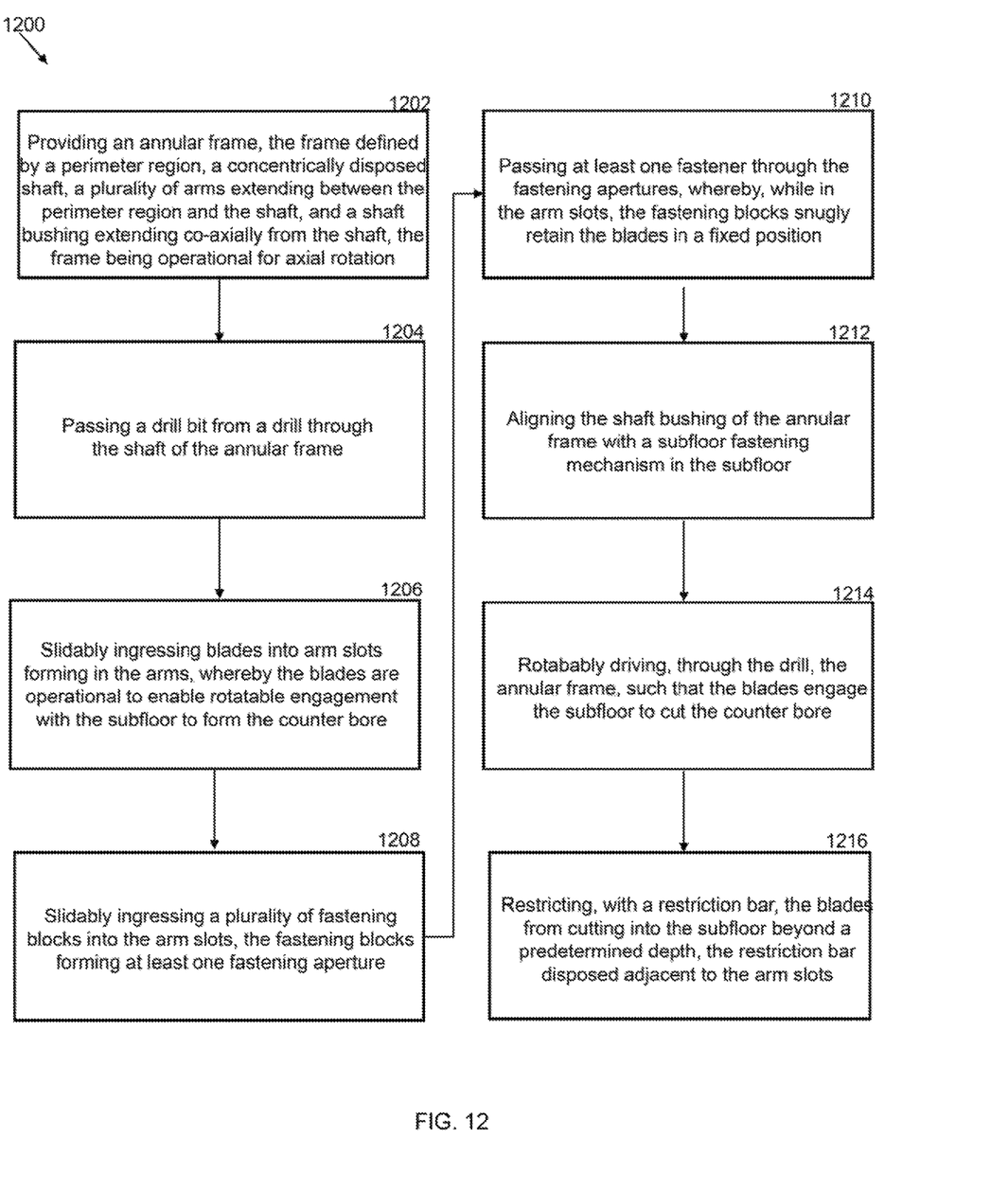
FIG. 12 illustrates a flowchart for an exemplary method 1200 for operating a self-aligning counter bore cutting tool, in accordance with an embodiment of the present invention.

FIG. 12 illustrates a flowchart for an exemplary method 1200 for operating a self-aligning counter bore cutting tool. The method 1200 may include an initial Step 1202 of providing an annular frame, the frame defined by a perimeter region, a concentrically disposed shaft, a plurality of arms extending between the perimeter region and the shaft, and a shaft bushing extending co-axially from the shaft, the frame being operational for axial rotation.

The method 1200 may further comprise a Step 1204 of passing a drill bit from a drill through the shaft of the annular frame. The drill 700 couples to the frame 102 of the cutting tool 100 to rotatably drive the blades 110a-d in the frame 102 against the subfloor 702, and thereby cut the counter bore 900. A Step 1206 includes slidably ingressing a plurality of blades into a plurality of arm slots forming in the arms, whereby the blades are operational to enable rotatable engagement with the subfloor to form the counter bore. The blades 110a-d are operational to slidably ingress and egress to and from the arm slot 302a-d. While in the arm slots 302a-d, the blades 110a-d are disposed coplanar against the flat wall 312 of the arm slots 302a-d.

In some embodiments, a Step 1208 comprises slidably ingressing a plurality of fastening blocks into the arm slots, the fastening blocks forming at least one fastening aperture. The fastening blocks 114a-d are operational to slidably ingress and egress the arm slots 302a-d. While in the arm slots 302a-d, the fastening blocks 114a-d retain the blades 110a-d at a fixed position in the arm slot. Thus, the blades 110a-d rest snugly and coplanar against the flat wall 312 of the arm slots 302a-d.

A Step 1210 includes passing at least one fastener through the fastening apertures, whereby, while in the arm slots, the fastening blocks snugly retain the blades in a fixed position. As illustrated, the blades 110a-d are positioned in the arm slots 302a-d and retained in a fixed position by the fastening blocks 114a-d. The blades 110a-d are fastened to a fixed depth by the fastening blocks 114a-d, so that the predetermined depth 902. The drill 700 drives the blades 110a-d to rotatably engage the subfloor 702.

In some embodiments, a Step 1212 may include aligning the shaft bushing of the annular frame with a subfloor fastening plate in the subfloor. The method 1200 may further comprise a Step 1214 comprises rotabably driving, through the drill, the annular frame, such that the blades engage the subfloor to cut the counter bore. A final Step 1216 includes restricting, with at least one restriction bar, the blades from cutting into the subfloor beyond a predetermined depth. The restriction frame 116a-b extends beyond the cutting blades 110 a-d and thereby restricts the blades 110a-d from cutting into the subfloor 702 beyond a predetermined depth 902 of about ⅜".

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A self-aligning counter bore cutting tool for cutting a counter bore in a subfloor, the tool comprising:
   an annular frame defined by a perimeter region and a concentrically disposed central shaft extending along a rotational axis, which defines a forward axial direction and a rearward axial direction, the perimeter region including an outer peripheral surface extending between a forward end surface and a rearward end surface, the central shaft protruding, in the axial forward direction, beyond the forward end surface, the central shaft includes a first central aperture;
   a shaft bushing mounted on and extending co-axially from the central shaft in the axial forward direction, the shaft bushing includes a second central aperture coaxial with the first central aperture;
   a drill bit located within and extending through the first central aperture and the second central aperture such that a cutting edge of the drill bit protrudes beyond the shaft bushing in the forward axial direction, the drill bit is fixed relative to the frame, whereby a drill causes rotation of the drill bit and the frame about the rotational axis;

a plurality of arms extending between the perimeter region of the frame and the central shaft, each of the plurality of arms includes:

exactly one arm slot defined by a sloped wall and a flat wall, the flat wall is parallel to a plane parallel to the rotational axis and the sloped wall is inclined relative to the plane, the sloped wall and the flat wall meeting at an inner junction point, and the sloped wall and the flat wall extending out to an open end at the forward end surface;

a cutting blade mounted in direct contact against the flat wall within the exactly one arm slot, the cutting blade defined by a cutting edge;

a fastening block defined by a tapered shape corresponding to the sloped wall and the flat wall, the fastening block mounted within the exactly one arm slot and retaining the cutting blade at a fixed position, the fastening block located in front of the cutting blade in a rotation direction;

at least one, but not all, of the plurality of arms includes a respective depth restriction bar protruding from and beyond the forward end surface in the forward axial direction, the respective depth restriction bar of the at least one, but not all of the plurality of arms:

is located between the shaft and the perimeter region; and is capable of restricting the cutting blades from cutting into the subfloor beyond a predetermined depth;

whereby the cutting blades are capable of engagement with the subfloor to cut the counter bore; and whereby the shaft bushing is capable of aligning the frame with a hole cut by the drill bit.

2. The self-aligning counter bore cutting tool of claim 1, wherein the arms form a cross shape inside the perimeter region of the frame.

3. The self-aligning counter bore cutting tool of claim 1, wherein the cutting blades are defined by a beveled shape.

4. The self-aligning counter bore cutting tool of claim 1, wherein the shaft bushing is defined by a cylindrical shape.

5. The self-aligning counter bore cutting tool of claim 1, wherein each fastening block includes at least one fastening aperture.

6. The self-aligning counter bore cutting tool of claim 5, wherein each sloped wall includes at least one wall aperture.

7. The self-aligning counter bore cutting tool of claim 6, further comprising a plurality of fasteners for mounting each fastening block within the exactly one arm slot, respectively.

8. The self-aligning counter bore cutting tool of claim 7, wherein each of the plurality of fasteners is a screw.

9. The self-aligning counter bore cutting tool of claim 1, wherein the predetermined depth is about ⅜ inches.

10. The self-aligning counter bore cutting tool of claim 1, the drill bit having a cutting diameter of about 1¼ inches.

11. A method of cutting the counter bore in the subfloor, the method comprising:

providing the self-aligning counter bore cutting tool of claim 1;

rotating the drill to drive rotation of the self-aligning counter bore cutting tool;

cutting the counter bore in the subfloor; and restricting, with the respective depth restriction bar of the at least one, but not all, of the plurality of arms, the cutting blades from cutting into the subfloor beyond the predetermined depth.

\* \* \* \* \*